Jan. 29, 1957  F. BAINBRIDGE  2,779,639
COMPOSITE ROLLERS PULLEYS AND THE LIKE
Filed March 23, 1953
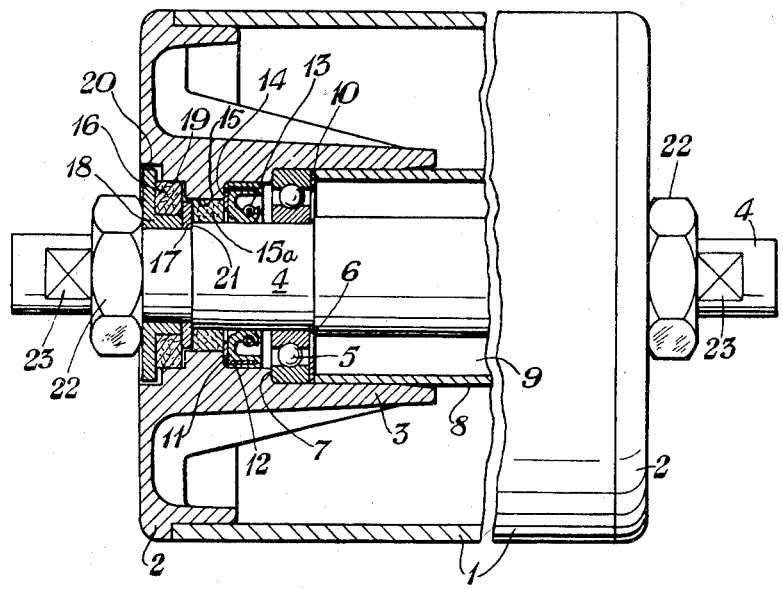
Inventor
Featherstone Bainbridge
by Sommers & Young
Attorneys

United States Patent Office 2,779,639
Patented Jan. 29, 1957

2,779,639

COMPOSITE ROLLERS, PULLEYS AND THE LIKE

Featherstone Bainbridge, Newcastle upon Tyne, England, assignor to Huwood Mining Machinery Limited, Gateshead upon Tyne, England Application March 23, 1953, Serial No. 344,102

4 Claims. (Cl. 308—187.1)

This invention relates to improvements in composite rollers, pulleys or the like, of the kind mounted on bearings on a spindle and having a hollow interior to contain a store of oil for lubricating the bearings.

Rollers of this kind are widely used as supporting rollers for mining belt conveyors.

In the specification of our prior British Patent No. 500,130 there is described a roller of the above kind which comprises a hollow roller body adapted for containing a charge of lubricating oil and mounted on ball or roller bearings on a spindle, internal means operative for supplying the oil to the bearings, and hydraulic packing means disposed between the hollow roller body and the spindle on the outer side of the bearings and adapted to prevent leakage of the oil from the interior of the body and ingress of foreign matter from the outside.

According to the present invention, a composite roller, pulley or the like comprises a hollow roller body adapted for containing a charge of lubricating oil and mounted on ball or roller bearings on a spindle, internal means operative for supplying the oil to the bearings, hydraulic packing means disposed between the body and the spindle on the outer side of the bearings and adapted to prevent leakage of oil from the interior of the body, a cavity between the said body and spindle on the outer side of the said packing means for containing a charge of lubricating grease, and sealing means for closing the said cavity on the side remote from the said packing means. The sealing means may advantageously consist of a felt washer held on the spindle by inner and outer retaining rings.

One embodiment of the invention is illustrated by way of example and partly in longitudinal section and partly broken away in the accompanying drawing. In this embodiment, the hollow roller body comprises a steel outer tube 1 and end caps 2, suitably of cast-iron, which are spigoted into the tube 1 and carry further circular spigots 3 on their inner sides. The spigots 3 are concentric with the stationary spindle 4 on which the roller runs. The roller is mounted on the spindle 4 by means of a pair of ball bearings 5 (only one of which is shown), one in each spigot 3. Each ball bearing 5 is located between a step 6 on the spindle 4 and a shoulder 7 on the corresponding spigot 3. An inner metal tube 8, concentric with the spindle 4 and forming part of the roller body, is fitted into the spigots 3 at each end of the roller and thus forms a reservoir 9 about the spindle 4 for containing a charge of lubricating oil and maintaining it in contact with the ball bearings 5. A leather or other sealing washer 10 is inserted between the end of the tube 8 and the outer race of the bearing 5, the inside diameter of the washer 10 being larger than the diameter of the inner race so as not to impede the flow of oil to the bearing. The washer 10 serves to prevent escape of oil into the space between the inner tube 8 and the outer tube 1.

A hydraulic packing 11 is provided on the outside of each bearing 5 to act as an oil seal. The packing 11 is of oil, grease and water resisting material and roughly S-shaped in section. The outer portion of the S receives the peripheral wall of a cupped metal washer 12 which fits with clearance around the spindle 4 and holds the packing tightly against the adjacent spigot 3. The inner portion of the S is held firmly on to the spindle 4 by a resilient coiled-wire ring 13. The ring 13 should not be too tight, so as not to introduce unnecessary friction. The packing 11 is held against outward displacement by a shoulder 14 on the spigot 3.

On the outside of the packing 11 is a cavity 15 between the spindle 4 and spigot 3. This cavity 15 is filled with a thick lubricating grease 15a which will assist in the prevention of escape of any oil which may get past the packing 11 but whose principal purpose is to prevent ingress of dirt, water and grit from outside into the bearings 5.

The charge of grease is retained in the cavity 15 by means of a felt sealing washer 16 disposed between two retaining rings 17, 18 and fitting in a stepped portion 19 on the inside of the end cap 2. The inner retaining ring 17 is a plain circular washer and the outer ring 18 consists of a collar having a radial flange extending into a further stepped portion 20 of the end cap 2. The washer 16 is retained between the ring 17 and the flange on the ring 18 and the whole assembly (rings 17, 18 and washer 16) is locked endwise against a shoulder 21 on the spindle 4 by means of a nut 22 or by the pressure of a spring (not shown). The spindle 4 may be extended beyond the nuts 22 and provided with flats 23 on opposite sides for mounting it on supports for the roller.

Each end of the roller is similarly constructed and as will be realised the roller embodies many of the advantages of the roller of the prior patent aforesaid while providing highly efficient inhibition of the entry of foreign matter, particularly dust, dirt and water, into the bearings.

The improvements of the invention are of advantageous application to the supporting rollers of belt conveyors, particularly mine conveyors, but they are not restricted to this application as they may be used for other purposes, for example in connection with belt and rope pulleys or rollers, particularly those used in mines and other underground workings.

I claim:

1. A composite roller, pulley or the like, comprising: a hollow roller body embodying an outer tube, end caps fitted into each end of said outer tube, a central circular spigot on each of said end caps, an inner tube fitted at each end into said spigots, a charge of lubricating oil contained within said inner tube, and an internal shoulder on each of said spigots; an anti-friction bearing fitted in each spigot between the adjacent end of the inner tube and said shoulder; a spindle on which said hollow roller body is revolubly mounted by the anti-friction bearings; a fluid-tight packing of oil, grease and water resisting material disposed in each spigot on the side of the anti-friction bearing remote from the inner tube and bearing against the spindle and the interior of the spigot; sealing means fitted in each end cap, said sealing means being spaced from said fluid-tight packing in the axial direction of the spindle so as to define, in conjunction with the exterior of said spindle and the interior of said end cap, an annular cavity; and a charge of lubricating grease contained within said cavity.

2. A composite roller, pulley or the like, comprising a spindle, a hollow roller body rotatably mounted on said spindle, anti-friction bearings arranged between said body and said spindle adjacent each end of said spindle, a container located internally of said roller body for maintaining a charge of lubricating oil in contact with said bearings, fluid-tight packing means disposed between said roller body and said spindle outwardly of said bearings for preventing leakage of oil from the interior of said body, sealing means disposed between said body and said spindle outwardly of said packing means, said sealing means being spaced axially from said packing means so as to define, in conjunction with said body and said spindle, an annular cavity, and a charge of lubricating grease contained within said cavity.

3. A composite roller, pulley or the like according to claim 2, wherein the sealing means comprises a felt washer and inner and outer retaining rings by which the washer is held on said spindle.

4. A composite roller, pulley or the like according to claim 3, wherein the fluid-tight packing means comprises a flattened S-section packing member, a cupped metal washer and a resilient ring, the outer flange of the packing member, which is turned outwardly towards the end of the spindle, being held tightly against said roller body by the peripheral wall of said cupped metal washer, which is turned inwardly towards the middle of the spindle, and the inner flange of the packing member, which is turned inwardly towards the middle of said spindle, being held firmly, but without undue tightness, on said spindle by said resilient ring.

References Cited in the file of this patent

UNITED STATES PATENTS

| 1,748,247 | Scribner | Feb. 25, 1930 |
| 2,207,790 | Fairbairn et al. | July 16, 1940 |
| 2,618,519 | Steinmetz | Nov. 18, 1952 |

FOREIGN PATENTS

| 500,130 | Great Britain | Feb. 3, 1939 |
| 580,871 | Great Britain | Sept. 23, 1946 |